United States Patent [19]
Eastgate

[11] 4,045,119
[45] Aug. 30, 1977

[54] FLEXIBLE LASER WAVEGUIDE
[75] Inventor: Harold F. Eastgate, Auckland, New Zealand
[73] Assignee: Laser Bioapplications, Los Angeles, Calif.
[21] Appl. No.: 586,713
[22] Filed: June 13, 1975

Related U.S. Application Data
[63] Continuation-in-part of Ser. No. 498,063, Aug. 14, 1974, abandoned.
[51] Int. Cl.² .............................................. G02B 5/14
[52] U.S. Cl. ............................ 350/96 LM; 350/96 R; 350/96 WG
[58] Field of Search ......... 350/96 LM, 96 WG, 96 R, 350/179, 96 M

[56] References Cited
U.S. PATENT DOCUMENTS

| 3,228,741 | 1/1966 | Becker ................................ 351/160 |
| 3,434,776 | 3/1969 | Kern ................................ 350/96 LM |
| 3,455,625 | 7/1969 | Brumley et al. ................... 350/96 C |
| 3,641,332 | 2/1972 | Reick et al. ..................... 350/96 WG |
| 3,740,113 | 6/1973 | Cass ................................ 350/96 LM |
| 3,814,497 | 6/1974 | Stone ................................ 350/96 LM |

OTHER PUBLICATIONS
Stone, article in Appl. Phys. Lett., vol. 20, No. 7, Apr. 1972, pp. 239-240.
Stone, article in IEEE Journal of Quantum Electronics, Mar. 1972, pp. 386-388.

*Primary Examiner*—John K. Corbin
*Assistant Examiner*—Stewart Levy
*Attorney, Agent, or Firm*—Fulwider, Patton, Rieber, Lee & Utecht

[57] ABSTRACT

A flexible tube filled with a liquid core material for transmitting, by total internal reflections within the tube, laser energy at relatively high power levels from a laser to a desired area of application. The tube and liquid materials are selected to be transparent to light at the wave length of output from the laser, and such that the tube material has a refractive index substantially lower than that of the liquid core material. Also disclosed are a number of liquid materials having highly desirable properties of low toxicity, color stability, low volatility, and compressibility. Various sealing means and input and output windows are disclosed for use at the ends of the tube.

7 Claims, 6 Drawing Figures

FLEXIBLE LASER WAVEGUIDE

CROSS-REFERENCE TO RELATED APPLICATION

This is a continuation-in-part of application Ser. No. 498,063, filed Aug. 14, 1974 now abandoned.

BACKGROUND OF THE INVENTION

This invention relates generally to flexible optical waveguides and, more particularly, to flexible waveguides for the transmission of laser beams at relatively high power levels, such as from pulsed lasers.

In recent years, lasers have been shown to be useful in a variety of medical, dental and industrial applications. Many such applications require the transmission of laser energy at relatively high powers from a laser to an area of application. In some cases, the laser itself can be portable or movable, but this is often impracticable, and there is then the requirement for a reliable and efficient waveguide to transmit the laser energy from a stationary laser source to the area of application. Clearly, such a waveguide must be relatively light in weight, not easily damaged by routine use, and, most importantly, it must be flexible enough to allow convenient and accurate application of the laser energy to any desired area. It will be apparent that a waveguide satisfying these requirements may also be usefully applied for the transmission of incoherent light at relatively high power levels, usually for the purposes of illumination.

One type of waveguide which in part meets these requirements consists of a series of mirrors arranged along an articulated arm, the laser beam being reflected from mirror to mirror along the arm. However, it will be apparent that such an arrangement has only limited flexibility, and is sensitive to errors in alignment, as well as being bulky and relatively expensive to manufacture and maintain.

Another general type of light waveguide employs the principle of total internal reflection to transmit light along a column or core of material, usually quartz or glass. If the material of the core has a refractive index higher than that of a cladding material, light incident on the junction between core and cladding will be almost totally reflected if the angle of incidence, measured from a line normal to the junction, is greater than a critical value. Thus, light can be transmitted along the fiber and reflected around bends, provided that their radius is not too small. The principal problem with optical fibers of this kind is that they must be very thin to provide the required flexibility. This fibers of quartz or the like are necessarily quite fragile, and present great difficulties for the transmission of large amounts of power. In laser applications, the power densities in thin fibers can be high enough to breakdown the material, and using bundles of fibers bonded together does not completely solve the problem, since breakdown can still occur in the cladding and bonding materials which absorb radiation directly. Thin fibers also present problems of alignment with a laser source and accurate "launching" of the light beam into the fibers.

Some optical fibers of this type have been formed from finely drawn quartz capillary tubes filled with a liquid, but the same problems of fragility, alignment, and breakdown of the material, prevent their use in any of the aforementioned applications requiring high power levels.

A flexible light guide comprising a liquid-filled plastic tube has been proposed in a patent to Cass, U.S. Pat. No. 3,740,113. However, the materials disclosed and suggested therein render such a light guide completely unsuitable for the transmission of laser energy, or even of high-power incoherent light.

Accordingly, there is a need, recognized by those familiar with the laser art and its potential applications, for a flexible waveguide which is capable of transmitting laser energy at high power, and which meets the other requirements described above. The aforementioned patent application, of which this application is a continuation-in-part, discloses and claims a liquid-core waveguide which has largely fulfilled the need for most areas of application. However, the core liquids disclosed and claimed therein have certain limitations which render them unsuitable in some applications. More specifically, under certain conditions, these core liquids: lack color stability when exposed to heat and high-intensity light; have varying degrees of toxicity rendering them unsuitable for some medical applications; and are volatile, a property which increases the difficulty of manufacture. Furthermore, changes in temperature cause differential thermal expansion between the liquid and cladding materials, usually resulting in the formation of bubbles and voids in waveguides which are permanently sealed at the ends. The present invention provides significant improvements in these areas over the waveguide disclosed and claimed in the parent application.

SUMMARY OF THE INVENTION

The present invention resides in a flexible, liquid-core waveguide for the transmission of a relatively high-powered laser beam to a desired area of application. Briefly, and in general terms, the waveguide of the invention includes a flexible tube of a material transparent to the particular wavelength of the laser beam, the tube having a core of liquid which is also transparent to that same wavelength and which has a refractive index substantially greater than that of the tube material. There are also means at each end of the tube to seal the liquid in, including an input window at one end, into which the laser beam is launched, and an output window at the other end.

More particularly, the liquid-core material should also be selected to be non-inflammable, chemically stable, and non-reactive with other components of the waveguide. Liquids found to meet all these requirements include, as disclosed and claimed in the aforementioned parent application, carbon tetrachloride, bromotrichloromethane, bromoform, and tetrachloroethylene. In accordance with the present invention, the liquid-core material is also relatively colorless, has high color stability, has a very low or no toxicity, is nonvolatile, and is compressible to allow sealing under compression and to thereby avoid formation of voids and bubbles. Liquids meeting these requirements include: dimethylpolysiloxane, methyl phenyl polysiloxane and methyl alkyl polysiloxanes.

The cladding or tube material is preferably a flexible plastic. In a presently preferred embodiment, the fluorocarbons, tetrafluoroethylenehexafluoropropylene (FEP) and chlorotrifluoroethylene (KEL-F) have been found to meet the requirements outlined above.

The input and output windows in the presently preferred embodiments are either sheets of quartz or quartz plugs. Also included is a lens arrangement to appropriately launch the laser beam into the waveguide through the input window. If quartz plugs are used, they may be sealed to the tube by means of a crimped, outer metal sheath, or by other similar means. The plugs may be slightly tapered, narrower toward the ends of the tube, to encourage more positive sealing.

In another embodiment of the invention, the waveguide includes an outer, protective sheath around the tube. In some instances, it may be desirable to deposit the cladding material directly onto the interior surface of the sheath.

It will be appreciated from the foregoing that the present invention fulfills an important need in the laser art for a flexible waveguide capable of transmitting high-power laser radiation reliably, safely and efficiently. Other aspects and advantages of the present invention will become apparent from the following more detailed description taken in conjunction with the accompanying drawings.

DETAILED DESCRIPTION

Figure 1:
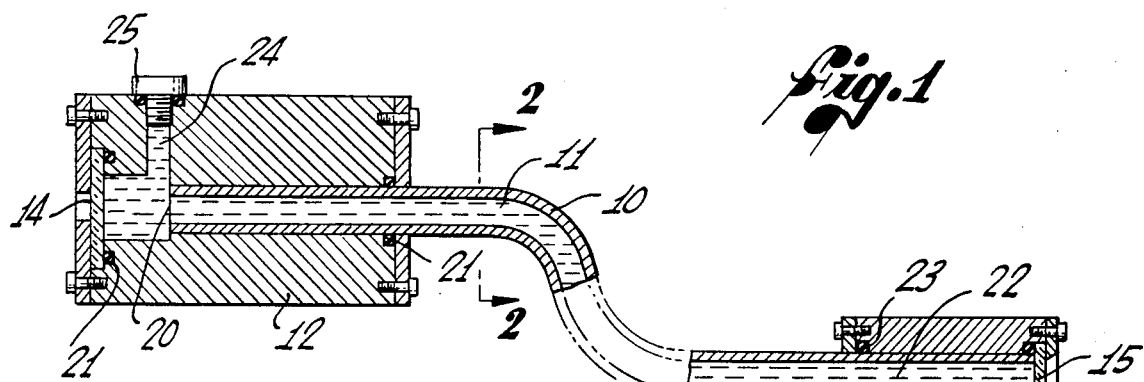
FIG. 1 is a longitudinal sectional view of a waveguide embodying the present invention.
Figure 2:
FIG. 2 is a cross-sectional view of the waveguide taken substantially along the line 2—2 in FIG. 1.

As shown in the drawings for purposes of illustration, the present invention is embodied in a flexible, liquid-filled, waveguide particularly well suited for the transmission of laser radiation at high power levels, as in pulsed laser operation. The waveguide employs the principle of total internal reflection commonly used in fiber-optic devices. Glass or quartz fibers are, however, unsuitable for many laser applications because, in order to be flexible, they must be drawn very thin. This means that as well as being fragile, the power density in single fibers is often enough to cause them to breakdown. Further, the launching of large diameter laser beams into small diameter fibers is extremely difficult.

Fiber optic bundles are also unsuitable for transmitting high energy laser pulses, as a percentage of the energy is launched directly into the cladding and cementing materials, causing breakdown of the bundle, and available liquid-filled tubes are unsuitable for transmission of laser energy and high-intensity incoherent light.

The present invention suffers from none of these disadvantages as the liquid core is homogenous and can be of any diameter necessary for ease of launching the beam and keeping the transmitted power density within limits, simply by selection of cladding tube and end terminals.

In accordance with the present invention, a flexible waveguide comprising a plastic tube 10 and a liquid core 11 provides a safe, convenient and reliable means of transmitting a laser beam at relatively high power to a desired area of application. The plastic tube 10 and liquid core 11 are selected so that the tube 10, or so-called cladding material, has a substantially lower refractive index than that of the liquid filling the tube. The materials selected for the tube 10 and liquid 11 also have to be transparent at the frequency or wavelength of the light transmitted through the waveguide.

Light transmitted into the tube 10 will be reflected from the internal walls of the tube so long as each angle of incidence (measured to a line normal to the tube walls) does not become too small because of sharp bends in the tube, i.e., the angle of incidence on the tube walls does not become less than the critical angle for the particular combination of cladding material and core liquid.

The waveguide of the invention also includes an input terminal block 12 and an output terminal block 13, which serves to seal the liquid 11 inside the tube 10, and provide input and output means for the laser beam to be transmitted through the waveguide. The input terminal block 12 includes an input window 14, which, in one of the presently preferred embodiments, is a sheet of quartz. A similar output window 15 is provided in the output terminal block 13. These terminal blocks also serve to attach input optics and a handpiece (not shown) at the output end control the beam and bring it to the desired focus.

Figure 5:
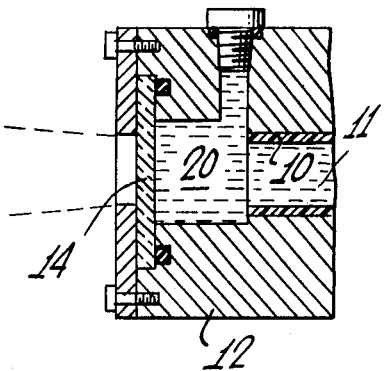
FIG. 5 is a longitudinal sectional view of a waveguide having an alternative window arrangement, and showing two alternative sealing means.
Figure 5:
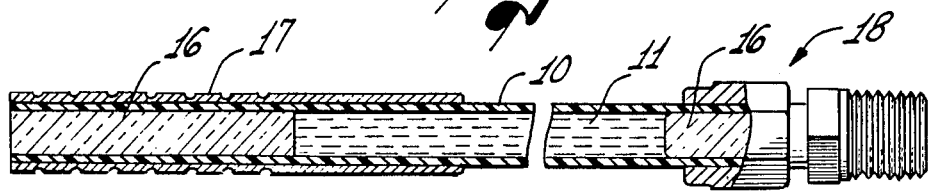

An alternative configuration, shown in FIG. 5 includes simple quartz plugs 16 for sealing the ends of the tube 10 and forming input and output windows. The plugs 16 may be sealed tightly in the tube 10 by any suitable means, such as a crimped outer metal sleeve 17. Alternatively, a commercially available tube fitting 18 may be used.

In addition to the principal requirements of transparency and refractive index, the material for the liquid core 11 should also preferably be non-inflammable, chemically stable, and non-reactive with other components of the waveguide. Although a number of materials fit these requirements, satisfactory results have been obtained with carbon tetrachloride, bromotrichloromethane, bromoform, and tetrachloroethylene, as well as with various mixtures of these.

While satisfactory for most application, the aforementioned liquid-core materials are unsuitable in certain conditions. In particular, they may discolor after prolonged exposure to heat and high-intensity light; they have varying degrees of toxicity which renders them unsuitable for some medical applications; they are volatile; and they are subject to thermal expansion and contraction at a rate different from that of the tube 10 or cladding material.

It has been found that dimethyl polysiloxane (refractive index 1.40), methyl phenyl polysiloxane (refractive index 1.44), and methyl alkyl polysiloxanes (refractive indices 1.4243–1.4555) have properties or combination of properties which can wholly or partially eliminate the aforementioned disadvantages. In particular, these materials are either completely colorless or are slightly yellow in color, but exhibit high color stability on exposure to heat and high-intensity light. They are non-toxic, or have very low toxicity. Dimethylpolysiloxane, for example, is available in grades which have been approved by the federal government for use in foodstuffs, and other grades are prepared for medical use. The materials are also non-volatile, making for less complicated manufacturing techniques. In addition, the compressible liquid materials listed herein by way of example may be mixed with any of the liquids disclosed in the aforementioned parent application, i.e., with carbon tetrachloride, bromotrichloromethane, bromoform, or tetrachloroethylene.

Finally, and very importantly, these liquid materials are compressible. Therefore, tubes having permanently sealed ends, as shown in FIG. 5, can be assembled with the liquid core 11 under compression. Thus, the assembled tube 10 and liquid 11 can accommodate to temperature changes without the formation of voids in the tube, since the liquid can expand or contract while still completely filling the tube cavity.

In assembling a waveguide of the type shown in FIG. 5, using one of the compressible liquids disclosed herein, it is preferable to use a plug 16 which is long in relation to its diameter. For example, if the waveguide is 6 feet long and 0.182 inch internal diameter, plugs 1.8 inches long and 0.190 inch diameter are suitable. The second plug to be inserted, after the liquid is added to the tube, can be used to compress the liquid, i.e., it can be pressed in over its full length without any liquid escaping. The liquid is then initially compressed, and is thereafter able to expand to fill a larger volume, should the tube expand. The plugs 16 may be slightly tapered, e.g., from 0.192 inch at the inner end to 0.188 inch at the outer end, to ensure a more positive seal.

It is desirable to have the plugs 16 made from material of the same refractive index as the liquid 11, to reduce losses at the liquid-plug interfaces.

If such a match is not possible, the plug 16 should be of higher refractive index than the liquid 11. Longer waveguides should include proportionately longer plugs to provide the desired degree of compression of the liquid.

The plastic tube 11 or cladding material, in addition to having a relatively low refractive index, has to be tough and flexible enough to meet the demands of repeated routing usage. However, it should not be so flexible that very sharp bends can be easily introduced, thereby preventing total internal reflection at some point in the tube 10. In the presently preferred embodiment, the tube material used and found to be satisfactory are the fluorocarbons, tetrafluoroethylene hexafluoropropylene (FEP), and chlorotrifluoroethylene (KEL-F).

The input terminal block 12, in the embodiment shown in FIG. 1, has a passageway 20 extending therethrough, and the input window 14 and the tube 10 are sealed to opposite ends of the passageway by means of O-rings 21, so that the hole forms an extension of the tube bore, and the input window acts as an end-wall to the tube. Similarly, the output terminal block 13 has a passageway 22 therethrough, and O-rings 23 act to seal the tube 10 and the output window 15 to the block. The terminal blocks 12 and 13 may be of stainless steel or any other suitable material unaffected by prolonged contact with the liquid core 11. A filler hole 24 and plug 25 are also provided in the input terminal block 12.

Figure 3:
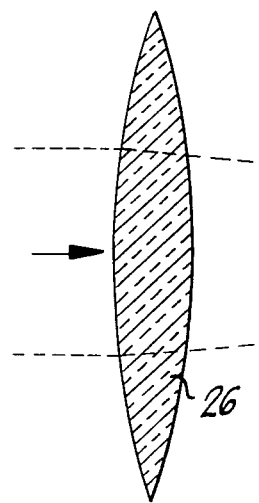
FIG. 3 is a partly diagrammatical view of a lens arrangement for launching a laser beam into the waveguide of FIG. 1.

It will be appreciated that the dimensions of the tube 10 are not critical to the invention, and will depend largely on the application. In the preferred embodiments tested, tubes of inside diameters up to eight millimeters were used. Since laser beams often have cross-sectional diameters greater than this, an arrangement such as the one shown in FIG. 3 will usually need to be employed to launch the laser beam accurately through the input window 14. The arrangement includes a double convex lens 26 of suitable focal length and location to reduce the laser beam diameter to approximately the inside diameter of the tube 10. Other optical equivalents of the lens 26 may, of course, be used to achieve the same result, i.e., to reduce the diameter of the laser beam so that it is fully contained within the confines of the input window 14. Ideally, however, the cross-sectional diameter of the laser beam should be just slightly less than the diameter of the core, so that the beam can be launched directly into the waveguide.

Figure 6:
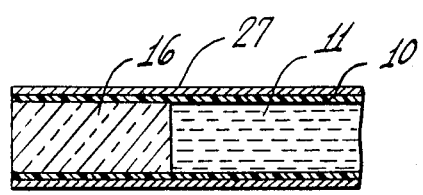
FIG. 6 is a fragmentary sectional view of a waveguide including an outer protective sheath.

In some applications, it may be desirable to cover the tube 10 with a protective outer sheath 27 (see FIG. 6). The sheath 27 has no optical function, however, and may take any suitable form, such as vinyl or rubber hose, or a flexible stainless steel structure. In an alternative form of construction, the tube material may be deposited directly onto the interior surface of the sheath 27.

The performance characteristics of the waveguide will, of course, depend on a number of factors, including the specific materials used, the dimensions, and the characteristics of the laser beam. One important measure of performance is the numerical aperture of the waveguide, given by the following formula:

$$NA = n_o \sin \theta = (n_1^2 - n_2^2)^{\frac{1}{2}}$$

where $NA$ = numerical aperture, $\theta$ = the maximum angle between the tube axis and a light ray which will still be totally internally reflected, $n_o$ = refractive index of medium outside waveguide, $n_1$ = refractive index of the liquid core 11, and $n_2$ = refractive index of the tube 10.

It can be seen from the formula that the higher the numerical aperture the greater the acceptance angle of the waveguide will be. In the presently preferred embodiments, a numerical aperture of 0.88 is obtained if bromoform is the liquid used and FEP the cladding material. This means that total internal reflection is obtained for light rays angled up to about 61° to the long axis of the tube. However, the above formula for numerical aperture applies only to a straight waveguide, i.e., the first portion of a flexible waveguide.

Figure 4:
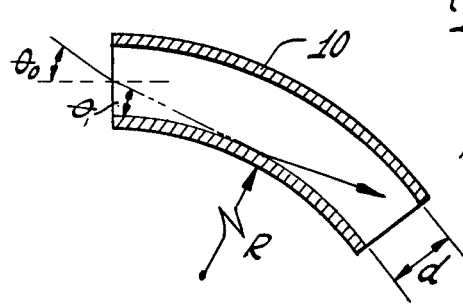
FIG. 4 is a diagrammatic longitudinal sectional view indicating refractions or reflections at a bend in the waveguide.

When the waveguide is bent, as shown in FIG. 4, the numerical aperture will change and becomes dependent on the radius of curvature R, the core diameter d, and the entrance position of the beam X, as well as one of the relationship of the refractive indices. In this case the numerical aperture is given by the formula:

$$NA(R) = n_1 \sin \theta 1 \geq [n_1^2 - n_2^2 (R+d/R+X)^2]^{\frac{1}{2}}$$

The effect of bending the tube is to reduce the numerical aperture so that light is lost more easily through the sides.

However, if the ratio d/R is very small, then NA(R) is approximately equal to NA, i.e., the smaller the internal diameter of the cladding tube, the smaller is the radius of curvature to which the waveguide can be bent and still transmit light without leakage.

Theoretically, if only meridional rays are considered, the minimum radius of curvature would be $$R \geq 3.5d$$

However, in a practical waveguide, only a few rays are meridional, and because skey rays are more likely to strike the walls at less than the critical angle, a general rule for optical waveguides working on the principle of total internal reflection is that the minimum radius of curvature should not be less than twenty times the core diameter.

Transmission losses in the waveguide may be caused by absorption or scattering by the liquid core 11 or impurities contained in it, by light leakage through the tube 10 due to interior surface irregularities, or by reflection at the surfaces of the windows 14 and 15. Window losses in one embodiment were measured at 14%. However, by matching the refractive index of the window material to that of the core, and coating the outer surface of the windows with an antireflection coating, these losses can be substantially reduced.

Power transmission tests conducted on various core materials, and using a 500-microsecond pulsed ruby laser, indicated that the power transmission capability of the waveguide is in the order of $10^6$ watts/cm$^2$, the exact figure depending on the selection and purity of the liquid used.

Good transmission was also achieved with a pulsed neodymium/glass laser at a wavelength of 1.06 microns. In all cases the beam undergoes complex changes in passing through the waveguide and it is thought the divergence angle of the output beam is greatly increased over than of the input beam.

It will be appreciated from the foregoing that the present invention represents a significant step forward in the field of waveguides for highpowered laser beams. In particular, a reliable, flexible waveguide is provided which is ideally suited for delivering laser energy to a desired area of application in such fields as medicine and dentistry. Although particularly presently preferred embodiments of the invention have been described in detail for purposes of illustration, it will be appreciated that various modifications may be made without departing from the spirit and scope of the invention. Accordingly, the invention is not to be limited except as by the appended claims.

I claim:

1. A flexible waveguide for the transmission of a high-power laser beam, comprising:
   a flexible tube of a material transparent to light of the same wavelength as that of the beam;
   a substantially compressible liquid core filling said tube, said liquid being also transparent to light at the same wavelength, having a refractive index substantially greater than that of the material of said tube and being retained in said tube in a compressed condition, with a volume substantially less than its volume when subjected to normal atmospheric pressure; and
   sealing means at each end of said tube, including an input window at one end and an output window at the other end for the transmission of the beam into and from said tube, respectively, and wherein at least one of said sealing means includes means for compressing said liquid core on assembly of said flexible waveguide;
   whereby the laser beam is transmissible around bends in said tube by multiple total internal reflections, to provide a portable source of laser energy at said output window, and said compressible liquid core is placed in said tube under pressure to prevent formation of cavities due to different rates of thermal expansion of said liquid and said tube.

2. A flexible waveguide as set forth in claim 1, wherein
   said tube material is a fluorocarbon selected from the group consisting of tetrafluoroethylenehexafluoropropylene and chlorotrifluoroethylene; and
   said liquid core is chemically inert with respect to said tube material.

3. A flexible waveguide as set forth in claim 1, wherein said sealing means are transparent plugs insertable into the ends of said tube to form end-walls thereof, and to initially compress said liquid core.

4. A flexible waveguide as set forth in claim 1, and further including an outer protective sheath around said tube.

5. A flexible waveguide for the transmission of a high-power laser beam, comprising:
   a flexible tube of a material transparent to light of the same wavelength as that of the beam;
   a substantially compressible liquid core filling said tube, said liquid being also transparent to light at the same wavelength, having a refractive index substantially greater than that of the material of said tube and being retained in said tube in a compressed condition, with a volume substantially less than its volume when subjected to normal atmospheric pressure; and
   sealing means at each end of said tube; including an input window at one end and an output window at the other end for the transmission of the beam into and from said tube, respectively, and wherein at least one of said sealing means includes means for compressing said liquid core on assembly of said flexible waveguide;
   wherein said tube material is a fluorocarbon selected from the group consisting of tetrafluoroethylenehexafluoropropylene and chlorotrifluoroethylene, and said liquid core is chemically inert with respect to said tube material and is of a material selected from the group consisting of dimethylpolysiloxane, methyl phenyl polysiloxane and the methyl alkyl polysiloxanes;
   whereby the laser beam is transmissible around bends in said tube by multiple total internal reflections, to provide a portable source of laser energy at said output window, and said compressible liquid core is placed in said tube under pressure to prevent formation of cavities due to different rates of thermal expansion of said liquid and said tube.

6. A flexible waveguide for the transmission of a high-power laser beam, comprising:
   a flexible tube of a material transparent to light of the same wavelength as that of the beam;
   a substantially compressible liquid core filling said tube, said liquid being also transparent to light at the same wavelength, having a refractive index substantially greater than that of the material of said tube and being retained in said tube in a compressed condition, with a volume substantially less than its volume when subjected to normal atmospheric pressure; and
   sealing means at each end of said tube, including an input window at one end and an output window at the other end for the transmission of the beam into and from said tube, respectively, and wherein at least one of said sealing means includes means for compressing said liquid core on assembly of said flexible waveguide;
   wherein said liquid core is of a material selected from the group consisting of dimethylpolysiloxane, methyl phenyl polysiloxane and the methyl alkyl polysiloxanes;

whereby the laser beam is transmissible around bends in said tube by multiple total internal reflections, to provide a portable source of laser energy at said output window, and said compressible liquid core is placed in said tube under pressure to prevent formation of cavities due to different rates of thermal expansion of said liquid and said tube.

7. A flexible waveguide for the transmission of a high-power laser beam, comprising:

a flexible tube of a material transparent to light of the same wavelength as that of the beam;

a substantially compressible liquid core filling said tube, said liquid being also transparent to light at the same wavelength, having a refractive index substantially greater than that of the material of said tube and being retained in said tube in a compressed condition, with a volume substantially less than its volume when subjected to normal atmospheric pressure; and sealing means at each end of said tube, including an input window at one end and an output window at the other end for the transmission of the beam into and from said tube, respectively, and wherein at least one of said sealing means includes means for compressing said liquid core on assembly of said flexible waveguide;

wherein said liquid core is of a mixture which includes a material selected from the group consisting of dimethylpolysiloxane, methyl phenyl polysiloxane and the methyl alkyl polysiloxanes;

whereby the laser beam is transmissible around bends in said tube by multiple total internal reflections, to provide a portable source of laser energy at said output window, and said compressible liquid core is placed in said tube under pressure to prevent formation of cavities due to different rates of thermal expansion of said liquid and said tube.

* * * * *

UNITED STATES PATENT AND TRADEMARK OFFICE
CERTIFICATE OF CORRECTION

PATENT NO. : 4,045,119
DATED : August 30, 1977
INVENTOR(S) : HAROLD F. EASTGATE

It is certified that error appears in the above-identified patent and that said Letters Patent are hereby corrected as shown below:

Column 1, line 52, "This" should be --Thin--.

Column 4, line 26, after "end" insert --to--;

line 44, "application" should be --applications--.

Column 6, line 46, "one of" should be --on--.

Column 7, line 25, "than" should be --that--.

Signed and Sealed this

Thirteenth Day of June 1978

[SEAL]

Attest:

RUTH C. MASON
Attesting Officer

DONALD W. BANNER
Commissioner of Patents and Trademarks